(12) United States Patent
Ohmae et al.

(10) Patent No.: US 11,181,540 B2
(45) Date of Patent: Nov. 23, 2021

(54) MEASUREMENT SYSTEM, RACK EXPORT-IMPORT UNIT, AND METHOD OF EXPORTING AND IMPORTING RACKS

(71) Applicant: SYSMEX CORPORATION, Kobe (JP)

(72) Inventors: Yuichiro Ohmae, Kobe (JP); Hiroo Tatsutani, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 683 days.

(21) Appl. No.: 15/623,501

(22) Filed: Jun. 15, 2017

(65) Prior Publication Data
US 2017/0285053 A1    Oct. 5, 2017

Related U.S. Application Data

(63) Continuation of application No. PCT/JP2015/006257, filed on Dec. 15, 2015.

(30) Foreign Application Priority Data

Dec. 24, 2014    (JP) .............................. JP2014-260039

(51) Int. Cl.
| | |
|---|---|
| *G01N 35/02* | (2006.01) |
| *G01N 35/04* | (2006.01) |
| *G01N 35/00* | (2006.01) |

(52) U.S. Cl.
CPC ..... *G01N 35/026* (2013.01); *G01N 35/00732* (2013.01); *G01N 35/04* (2013.01);
(Continued)

(58) Field of Classification Search
CPC ........... G01N 35/026; G01N 35/00732; G01N 35/04; G01N 2035/00752;
(Continued)

(56) References Cited

U.S. PATENT DOCUMENTS

| | | | |
|---|---|---|---|
| 2011/0076194 A1* | 3/2011 | Kitagawa | G01N 35/026 422/65 |
| 2011/0236165 A1 | 9/2011 | Kaiga | |
| 2011/0244582 A1 | 10/2011 | Tatsutani | |

FOREIGN PATENT DOCUMENTS

| | | |
|---|---|---|
| CN | 1181826 A | 5/1998 |
| EP | 2299281 A2 | 3/2011 |

(Continued)

OTHER PUBLICATIONS

Office Action dated Jun. 17, 2021 in a counterpart European patent application.

*Primary Examiner* — Benjamin R Whatley

(74) *Attorney, Agent, or Firm* — Metrolex IP Law Group, PLLC

(57) ABSTRACT

A measurement system according to one or more embodiments may include a measurement unit that measures a sample contained in a sample container; a transport unit including a first transporter that transports a rack holding sample containers in a longitudinal direction of the rack to the measurement unit, and a second transporter that transports the rack from the measurement unit; and a rack export-import unit that sets racks thereon, that is capable of transferring each of the set racks in a lateral direction of the rack, that exports the rack to the first transporter from one end side of the rack export-import unit, and that imports the rack transported by the second transporter from another end side of the rack export-import unit. The rack export-import unit includes a transfer prevention section that prevents the rack imported from the other end side from being transferred from the one end side.

14 Claims, 13 Drawing Sheets

(52) U.S. Cl.
CPC ............ *G01N 2035/00752* (2013.01); *G01N 2035/00801* (2013.01); *G01N 2035/0412* (2013.01); *G01N 2035/0465* (2013.01)

(58) Field of Classification Search
CPC . G01N 2035/00801; G01N 2035/0412; G01N 2035/0465
See application file for complete search history.

(56) References Cited

FOREIGN PATENT DOCUMENTS

| | | |
|---|---|---|
| EP | 2299281 A3 | 4/2015 |
| JP | 2002-90378 A | 3/2002 |
| JP | 2010-139370 A | 6/2010 |
| JP | 2011-75445 A | 4/2011 |
| JP | 2011-209218 A | 10/2011 |
| WO | 96/25712 A1 | 8/1996 |

* cited by examiner

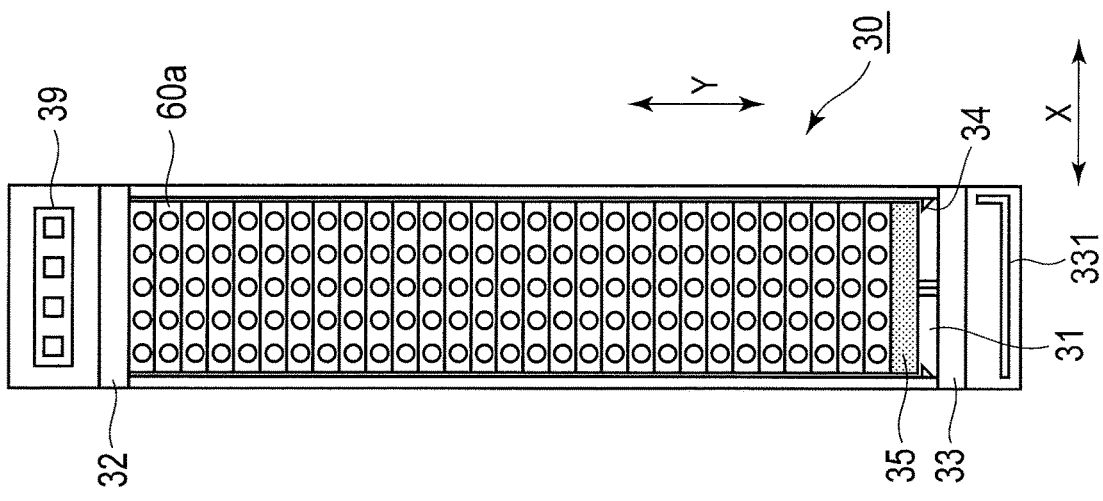
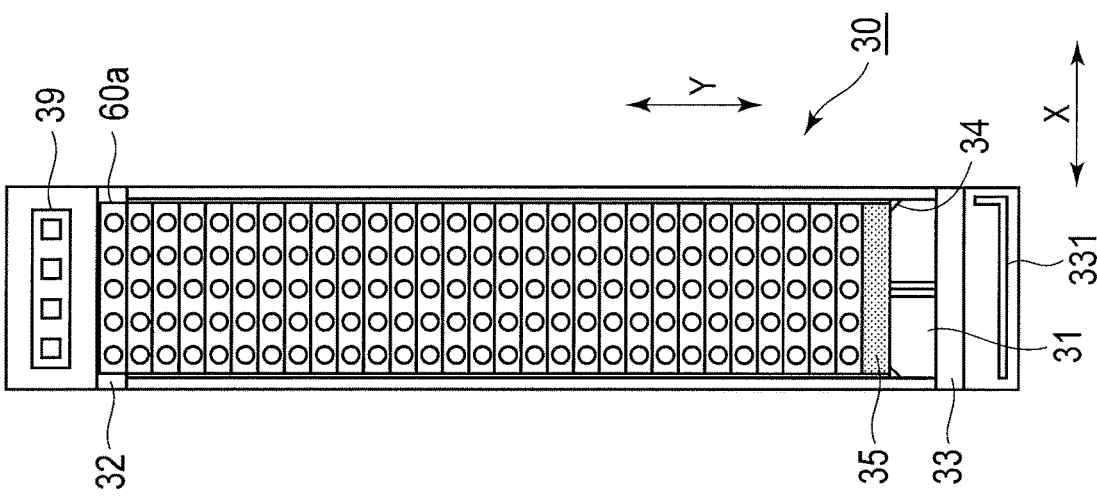

MEASUREMENT SYSTEM, RACK EXPORT-IMPORT UNIT, AND METHOD OF EXPORTING AND IMPORTING RACKS

CROSS REFERENCE TO RELATED APPLICATIONS

This application is a continuation application of International Application No. PCT/JP2015/006257, filed on Dec. 15, 2015, entitled "MEASUREMENT SYSTEM, RACK EXPORT-IMPORT UNIT, AND METHOD OF EXPORTING AND IMPORTING RACKS", which claims priority based on the Article 8 of Patent Cooperation Treaty from prior Japanese Patent Applications No. 2014-260039, filed on Dec. 24, 2014, the entire contents of which are incorporated herein by reference.

BACKGROUND

This disclosure relates to a measurement system, a rack export-import unit, and a method of exporting and importing racks.

Japanese Patent Application Publication No. 2011-75445 ("Patent Literature 1") discloses a sample processing system which includes a rack dispatch unit for feeding a rack holding an unprocessed sample, and a rack collection unit for collecting a rack holding a processed sample. In the sample processing system disclosed in Patent Literature 1, the rack dispatch unit stores racks holding unprocessed samples and aligned in a row, and dispatches the racks in order to supply the racks to a sample processing apparatus. A rack is transported to the sample processing apparatus via a transport line, while a rack holding a processed sample is transported to the rack collection unit via a return line. The rack collection unit receives racks, and stores the racks aligned in a row.

SUMMARY

A measurement system according to one or more embodiments includes: a measurement unit that measures a sample contained in a sample container; a transport unit including a first transporter that transports a rack capable of holding sample containers in a longitudinal direction of the rack to the measurement unit, and a second transporter that transports the rack from the measurement unit; and a rack export-import unit that is capable of setting racks thereon, that is capable of transferring each of the set racks in a lateral direction of the rack, that exports the rack to the first transporter from one end side of the rack export-import unit, and that imports the rack transported by the second transporter from another end side of the rack export-import unit. The rack export-import unit includes a transfer prevention section that prevents the rack imported from the other end side from being transferred from the one end side.

A rack export-import unit according to one or more embodiments includes: a setting section that is capable of setting racks thereon and that is capable of transferring each of the set racks in a lateral direction of the rack; an export section that is positioned on one end side of the setting section and that exports the rack transferred from the setting section; an import section that is positioned on another end side of the setting section and that imports the rack to the setting section; and a transfer prevention section that prevents the rack imported from the other end side from being transferred from the one end side.

A method of exporting and importing racks according to one or more embodiments includes: exporting one rack holding a sample container from a rack export-import unit that is capable of setting racks thereon and that is capable of transferring each of the set racks in a lateral direction of the rack; transporting the one rack exported from the rack export-import unit to a measurement unit that measures a sample contained in the sample container; transporting the one rack to the rack export-import unit after the measurement unit completes the measurement; and importing the one rack to the rack export-import unit such that the one rack is aligned with another rack set on the rack export-import unit in the lateral direction. The one rack and the other rack are aligned with each other in the lateral direction with interposing a transfer prevention section that is movable in the lateral direction on the rack export-import unit.

BRIEF DESCRIPTION OF DRAWINGS

FIG. 11A is a diagram illustrating a plan view for explaining setting of the racks on the rack export-import unit;

FIG. 11B is a diagram illustrating a plan view for explaining transfer of the racks on the rack export-import unit;

DETAILED DESCRIPTIONS

Figure 1:
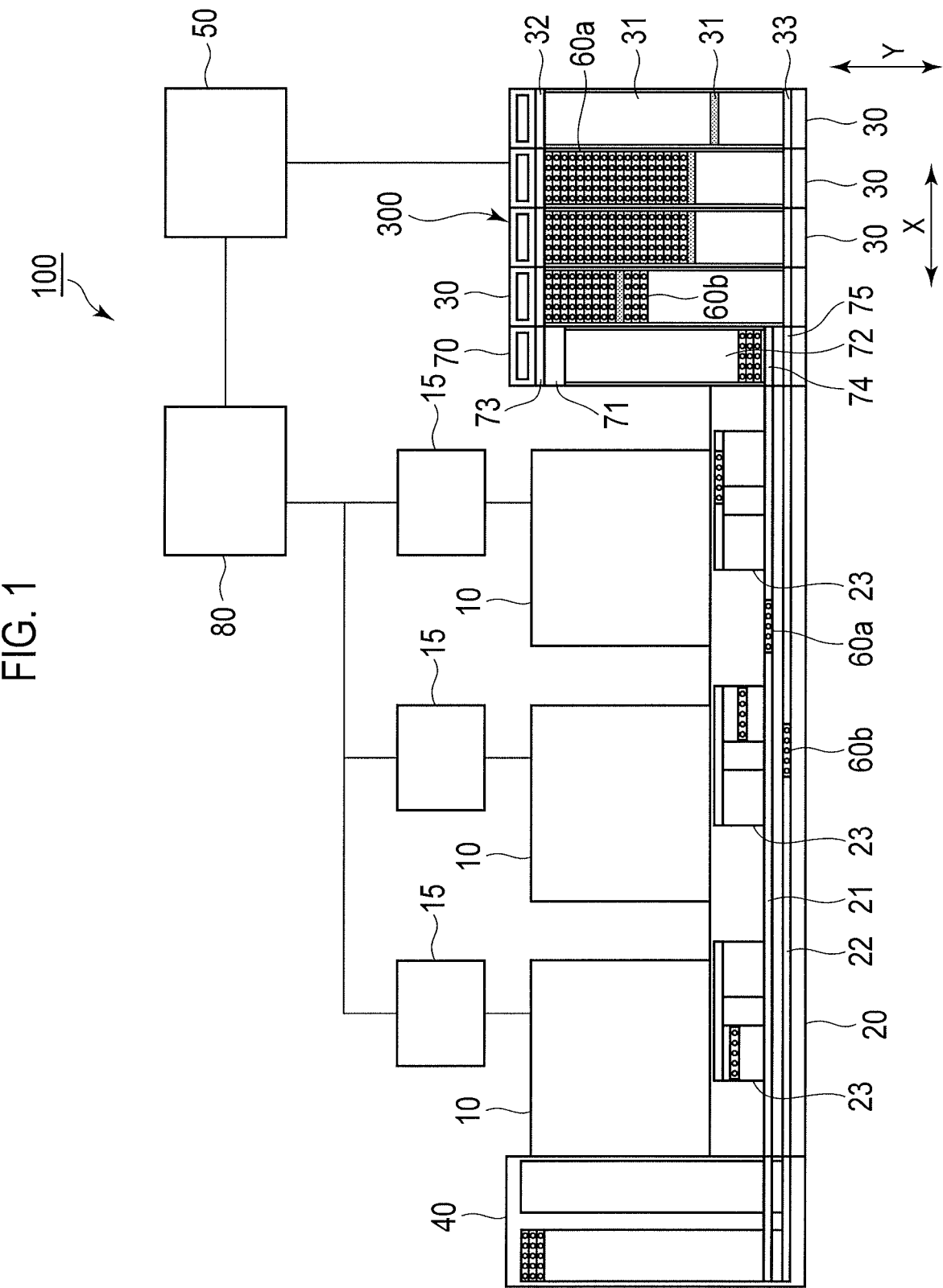
FIG. 1 is a diagram illustrating a plan view illustrating a configuration of a measurement system according to one or more embodiments.

Embodiments are explained with reference to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on one or more embodiments. For this reason, specific dimensions and the like should be interpreted with the following descriptions taken into consideration. In addition, the drawings may include parts whose dimensional relationship and ratios are different from one drawing to another.

<Configuration of Measurement System>

In one or more embodiments, a description is provided on a measurement system for measuring an antigen or an antibody which is contained in a serum sampled from a subject.

A configuration of the measurement system is described with reference to FIG. 1. Measurement system 100 includes measurement unit 10, information processing unit 15, transport unit 20, rack export-import unit 30, retest wait unit 40, and control unit 50.

Rack export-import units 30 and one bar code read unit 70 constitute rack export-import apparatus 300. Rack export-import apparatus 300 is used when a user feeds measurement system 100 with racks 60a holding sample containers containing unmeasured samples, or when the user collects racks 60b holding sample containers containing measured samples from measurement system 100.

Rack export-import apparatus 300 and retest wait unit 40 are installed apart from each other on a horizontal floor surface in a user's facility. Long thin transport unit 20 connects rack export-import apparatus 300 and retest wait unit 40 together. In the following description, a first transport direction from rack export-import apparatus 300 to retest wait unit 40 is referred to as a "supply direction," and a second transport direction from retest wait unit 40 to rack export-import apparatus 300 is referred to as a "return direction." A direction perpendicular to the supply direction and the return direction is referred to as a "front-rear direction." A direction perpendicular to all of the supply direction, the return direction, and the front-rear direction is referred to as an "up-down direction."

Measurement system 100 includes three measurement units 10 and three information processing units 15. Three measurement units 10 are arranged along the supply direction on the front side of transport unit 20.

Each of measurement units 10 is an immune measurement unit for measuring a sample being a serum with use of chemiluminescence enzyme immunoassay (CLEIA), and for testing various items such as Hepatitis B, Hepatitis C, a tumor marker, and a thyroid hormone. Each measurement unit 10 includes an aspiration unit for aspirating a sample, and aspirates a sample contained in a sample container being a test tube. Measurement unit 10 measures a sample by mixing the aspirated sample with a reagent to prepare a measurement specimen, and optically measuring the measurement specimen.

Measurement unit 10 is not limited to an immune measurement unit, and may be a measurement unit of a different type. For example, measurement unit 10 may be a blood cell measurement unit which classifies and counts blood cells contained in a whole blood sample with use of a flow cytometry method. Measurement unit 10 may be a blood coagulation measurement unit for testing items relating to blood coagulation functions with use of, for example, a coagulation method, a synthetic substrate method, and an immunonephelometry. Measurement unit 10 may be a urine particle measurement unit which measures particles contained in a urine sample by the flow cytometry method or analysis of microscope images. Measurement unit 10 may be a biochemical measurement unit for measuring a serum or a urine sample using a colorimetric method, and for testing measurement items relating to, for example, sugar, cholesterol, proteins, and enzymes.

The number of measurement units 10 is not limited to three. Measurement units 10 of the same type may be installed, or measurement units of different types may be installed.

Each of information processing units 15 includes a personal computer. Specifically, each of information processing units 15 is implemented such that, for example, a circuitry such as one or more central processing units (CPUs) or processors provided in information processing unit 15 executes a predetermined program(s). Three information processing units 15 are in one-to-one correspondence with three measurement units 10. In other words, one information processing unit 15 is connected to one measurement unit 10.

Measurement unit 10 transmits measurement data obtained by measuring a sample to corresponding information processing unit 15. Information processing unit 15 analyzes the measurement data, produces analysis results, and displays the results. Information processing units 15 are connected to host computer 80, and transmit the analysis results to host computer 80. Host computer 80 stores the analysis results received from information processing units 15 in a database. Note that host computer 80 is implemented such that, for example, a circuitry such as one or more central processing units (CPUs) or processors provided in host computer 80 executes a predetermined program(s).

Transport unit 20 transports racks 60a, holding sample containers containing unmeasured samples in a longitudinal direction, from rack export-import units 30 to measurement units 10, and transports racks 60b, holding sample containers containing samples measured by measurement units 10, to rack export-import units 30.

Figure 2:
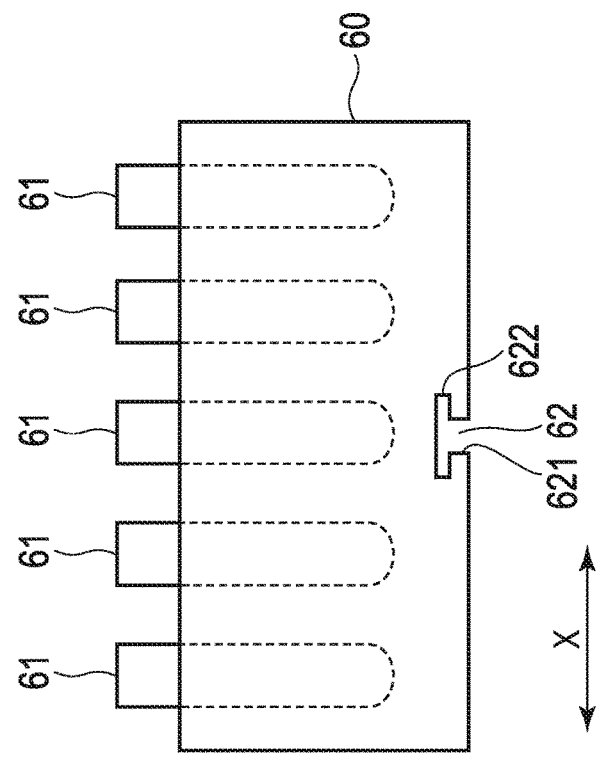
FIG. 2 is a diagram illustrating a front view illustrating a configuration of a rack.

As illustrated in FIG. 2, rack 60 aligns five sample containers 61 being test tubes in the longitudinal direction and holds the sample containers. Hereinafter, the longitudinal direction of rack 60 is referred to as an "X-direction," and a lateral direction of rack 60 is referred to as a "Y-direction."

With reference again to FIG. 1, transport unit 20 includes first transporter 21 for transporting racks 60a, holding sample containers containing unmeasured samples, to measurement units 10, and second transporter 22 for returning racks 60b holding sample containers containing samples completed with measurement. Each of first transporter 21 and second transporter 22 is a conveyor belt extending long in parallel with each other. First transporter 21 transports racks 60a in the supply direction. Second transporter 22 transports racks 60b in the return direction. Note that first transporter 21 and second transporter 22 are not limited to a conveyor belt. First transporter 21 and second transporter 22 may be configured to transport racks 60 using a member such as a lever which pushes racks 60, or to transport racks 60 using a claw-shaped member which moves in engagement with racks 60.

Transport unit 20 includes measurement paths 23 at positions corresponding to respective measurement units 10. Each of measurement paths 23 is a transfer path for racks 60 and is connected to first transporter 21. Rack 60a holding unmeasured samples is transported by first transporter 21 to the vicinity of measurement unit 10 being a transport destination, and then is pulled into measurement path 23 corresponding to measurement unit 10 being the transport destination. Measurement unit 10 aspirates samples from sample containers 61 which are held by rack 60a pulled into measurement path 23, and performs measurement. Rack 60b, holding sample containers 61 all samples of which have been aspirated, is transferred from measurement path 23 to first transporter 21, and is transported by first transporter 21 in the supply direction.

Rack export-import unit 30 is a unit used by the user when feeding measurement system 100 with racks 60a holding sample containers 61 containing unmeasured samples, or when collecting racks 60b holding sample containers 61 containing measured samples from measurement system 100. Also, rack export-import unit 30 is a rack feed-collection unit. Rack export-import unit 30 can connect to other rack export-import units 30 in the supply direction and the return direction. Rack export-import apparatus 300 can be provided with any number of rack export-import units 30. In addition, rack export-import unit 30 can connect to bar code read unit 70 in the supply direction. Hereinafter, the unit connected on the upstream side in the supply direction of a given unit is referred to as a preceding connected unit, and the unit connected on the downstream side in the supply direction of a given unit is referred to as a following connected unit.

Rack export-import unit 30 includes: setting section 31 which is capable of setting racks 60 thereon in a row in the lateral direction of racks 60, i.e., the Y-direction; export section 32 which is disposed on one end side of setting section 31 and which exports racks 60 from setting section 31; and import section 33 which is disposed on the other end side of setting section 31 and which imports racks 60 to setting section 31. To be more specific, rack export-import unit 30 is capable of exporting racks 60a holding sample containers containing unmeasured samples from one end side to first transporter 21, and importing, from the other end side, racks 60b which are transported by second transporter 22 and hold sample containers 61 containing measured samples.

Setting section 31 has a rectangular shape long in the front-rear direction in a plan view, and is formed flat so as to facilitate setting of racks 60. Setting section 31 is provided on an upper surface of rack export-import unit 30. A width of setting section 31 is slightly larger than a length of rack 60, and racks 60 can be mounted in a row on setting section 31 in the front-rear direction. To be more specific, in a state where racks 60 are set on setting section 31, the Y-direction coincides with the front-rear direction, and the X-direction coincides with the supply direction and the return direction.

Figure 3:
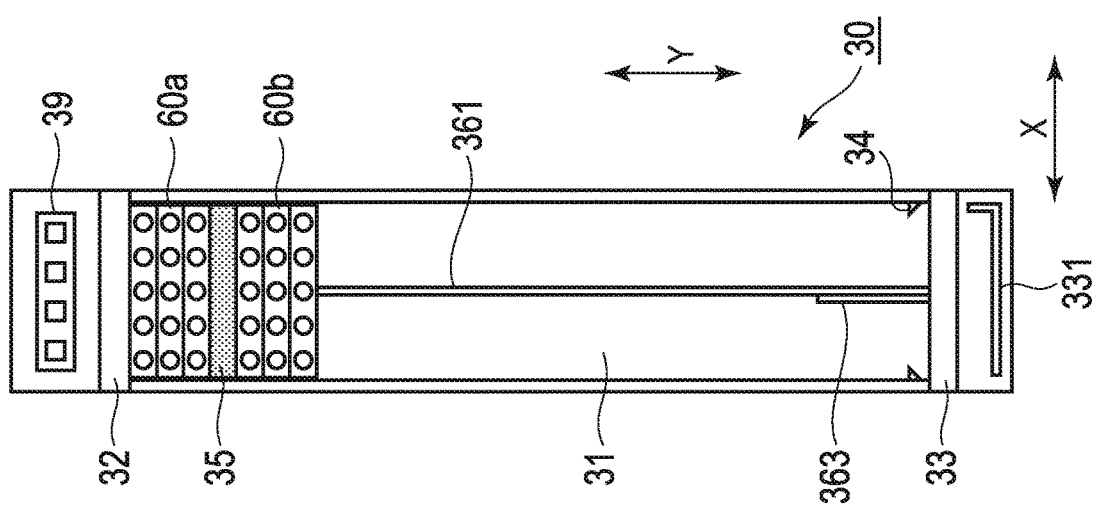
FIG. 3 is a diagram illustrating a plan view illustrating a configuration of a rack export-import unit.

With reference to FIG. 3, a description is provided for a configuration of rack export-import unit 30 in further detail. Export section 32 is provided on the front side of setting section 31, and import section 33 is provided on the rear side of setting section 31. Setting section 31 includes transfer units 34 for transferring racks 60 forward. Transfer units 34 are claw-shaped members capable of protruding from both sides of setting section 31, and move in the Y-direction in a protruding state. Transfer units 34 transfer racks 60 forward by moving forward in engagement with racks 60 on both sides.

Attached to setting section 31 is transfer prevention section 35 for preventing the transfer of racks 60b holding measured samples to export section 32. Transfer prevention section 35 is attached to setting section 31 so as to be movable in the Y-direction on setting section 31.

Racks 60 can be set in a region on the front side and a region on the rear side of setting section 31 with transfer prevention section 35 in between. Transfer units 34 transfer racks 60 and transfer prevention section 35 together. When transfer units 34 transfer one rack 60 forward, this rack 60, directly transferred by transfer units 34, pushes racks 60 and transfer prevention section 35 on the front side of this rack 60, thereby transferring the racks and the transfer prevention section forward. Similarly, when transfer units 34 transfer transfer prevention section 35 forward, transfer prevention section 35 pushes racks 60 on the front side of transfer prevention section 35, thereby transferring the racks forward.

Each of import section 33 and export section 32 is a conveyor belt for transporting racks 60. Import section 33 receives racks 60b holding measured samples from a preceding unit and transports the racks in the return direction. Import section 33 includes a sensor, and the sensor detects whether or not there is rack 60b on import section 33. Provided on the rear side of import section 33 is introduction unit 331 for introducing racks 60b from import section 33 to setting section 31. When the entirety of rack 60b is positioned on the rear side of setting section 31, introduction unit 331 pushes rack 60b forward, and feeds the rack to setting section 31. Note that import section 33 and export section 32 are not limited to a conveyor belt. In addition, introduction unit 331 may be configured not only to push out rack 60b from import section 33 to setting section 31, but also to pull rack 60b from import section 33 to setting section 31.

Import section 33 can transfer racks 60b which are received from a preceding unit and hold measured samples to a following unit without feeding the racks to setting section 31.

Racks 60 set on setting section 31 are transferred forward together with transfer prevention section 35 by transfer units 34. Rack 60 located on the frontmost side is transferred from setting section 31 to export section 32. A size of export section 32 is large enough to set one rack 60 thereon. Export section 32 transports received racks 60 in the supply direction and feeds the racks to a preceding unit. Export section 32 includes a sensor, and the sensor detects whether or not there is rack 60 on export section 32.

Export section 32 can receive racks 60a holding unmeasured samples from a following unit and transfer the racks to a preceding unit.

On setting section 31, racks 60a holding unmeasured samples are set in a region on the front side of transfer prevention section 35. As described earlier, racks 60b holding measured samples are imported by import section 33, and fed from import section 33 to setting section 31. Since transfer prevention section 35 is located on setting section 31, the transfer prevention section is always located on the front side of racks 60b imported by import section 33. Thus, on setting section 31, racks 60b holding measured samples are set in a region on the rear side of transfer prevention section 35. For this reason, transfer prevention section 35 functions as a partition for partitioning racks 60*a* holding unmeasured samples from racks 60*b* holding measured samples.

Observation of transfer prevention section 35 enables the user to check approximately how many racks 60*a* holding unmeasured samples are remaining.

Transfer prevention section 35 may be formed in the shape of, for example, a thin plate with a height lower than that of rack 60 so that transfer prevention section 35 cannot be observed. In this case, the configuration may be such that LEDs are arranged on the side of setting section 31 along the longitudinal direction of setting section 31, and the LEDs on the side of racks 60*a* holding unmeasured samples are turned on and the LEDs on the side of racks 60*b* holding measured samples are not turned on. This enables the user to differentiate racks 60*a* holding unmeasured samples from racks 60*b* holding measured samples, making it possible to check approximately how many racks 60*a* are remaining. Alternatively, a display unit of control unit 50 may be configured to display the number of remaining racks 60*a* holding unmeasured samples for each rack export-import unit 30.

Figure 4:
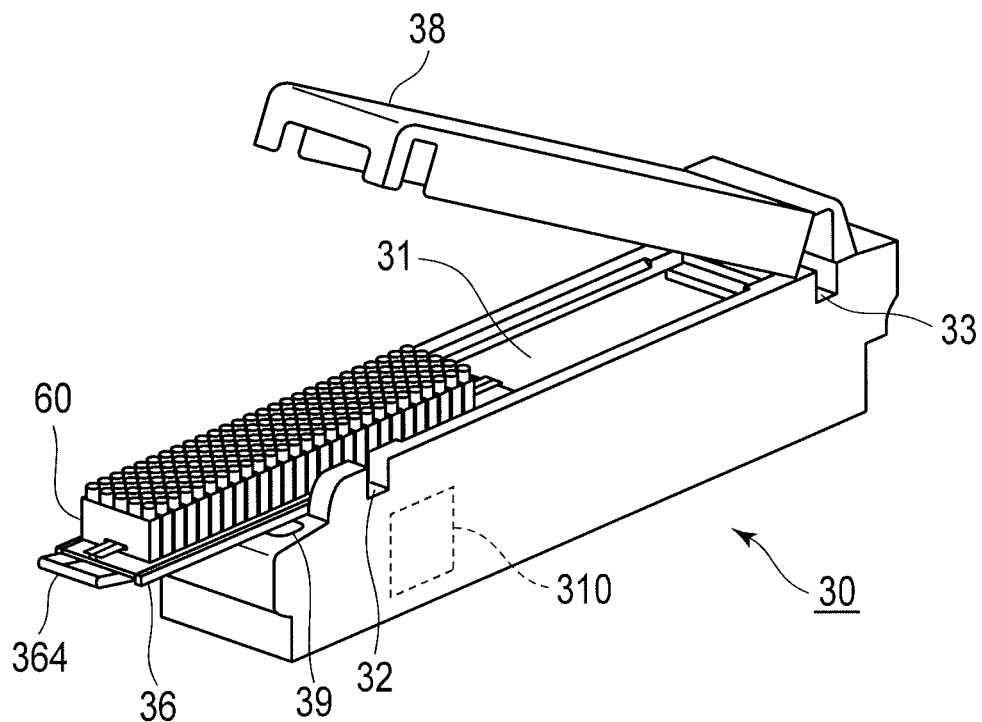
FIG. 4 is a diagram illustrating a perspective view illustrating the configuration of the rack export-import unit.

FIG. 4 is referred to. Attachable to and detachable from setting section 31 is tray 36 on which racks 60 can be set. To be more specific, setting section 31 can set racks 60 thereon using tray 36. Grasp unit 364 is provided on one end of tray 36. The user can attach tray 36 to and detach tray 36 from rack export-import unit 30 and carry rack export-import unit 30 with while grasping grasp unit 364. Tray 36 is inserted to setting section 31 from the front side. When tray 36 is installed on setting section 31, grasp unit 364 is positioned on the front side. The attachment of tray 36 to setting section 31 and the detachment of tray 36 from setting section 31 are detected by a sensor.

Figure 5:
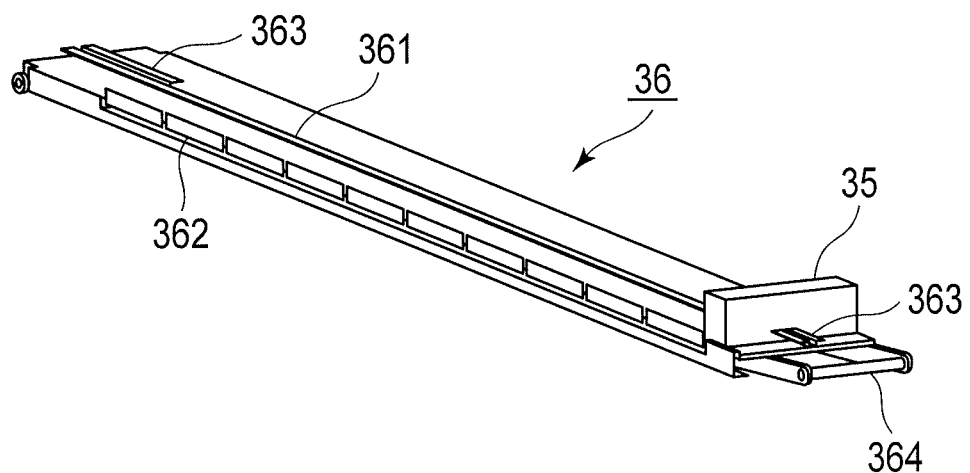
FIG. 5 is a diagram illustrating a perspective view illustrating a configuration of a tray.

As illustrated in FIG. 5, transfer prevention section 35 is attached to tray 36. To be more specific, transfer prevention section 35 is attached to and detached from rack export-import unit 30 together with tray 36.

The configuration of rack export-import unit 30 is not limited to one which enables attachment and detachment of tray 36. Rack export-import unit 30 may have a configuration where setting section 31 for setting racks 60 is fixed to the rack export-import unit.

Figure 6:
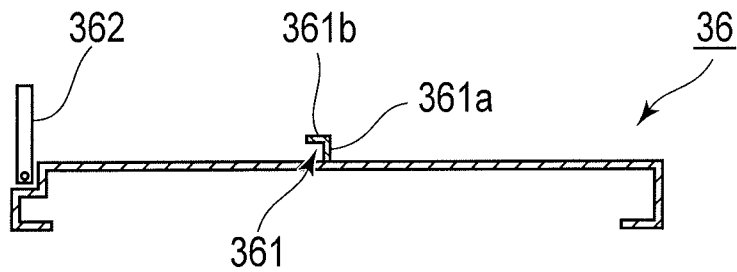
FIG. 6 is a diagram illustrating a cross-sectional view illustrating the configuration of the tray.

Provided on an upper surface of tray 36 is rail-shaped guide section 361 extending in the longitudinal direction. As illustrated in FIG. 6, guide section 361 is formed by bending a metal plate at the right angle. Guide section 361 includes vertical portion 361*a* erecting vertically from the upper surface of tray 36 and horizontal portion 361*b* extending horizontally from an upper end of vertical portion 361*a*. As illustrated in FIG. 2, provided at a central lower end portion of rack 60 is notch portion 62 with a shape corresponding to a cross-sectional shape of guide section 361, and guide section 361 can engage with notch portion 62.

As illustrated in FIG. 5, plate-shaped members 362 are arranged on one lateral end of tray 36. Each of plate-shaped members 362 is a substantially rectangular plate long in the longitudinal direction of tray 36, and is attached to tray 36 so as to erect vertically from the upper surface of tray 36. As illustrated in FIG. 6, plate-shaped member 362 can pivot on a lower end thereof relative to tray 36, and can tilt relative to the upper surface of tray 36 while receding from the upper surface. A spring is attached to plate-shaped member 362 and restores the plate-shaped member from a tilted state to a vertically upright state using the spring force.

Figure 7A:
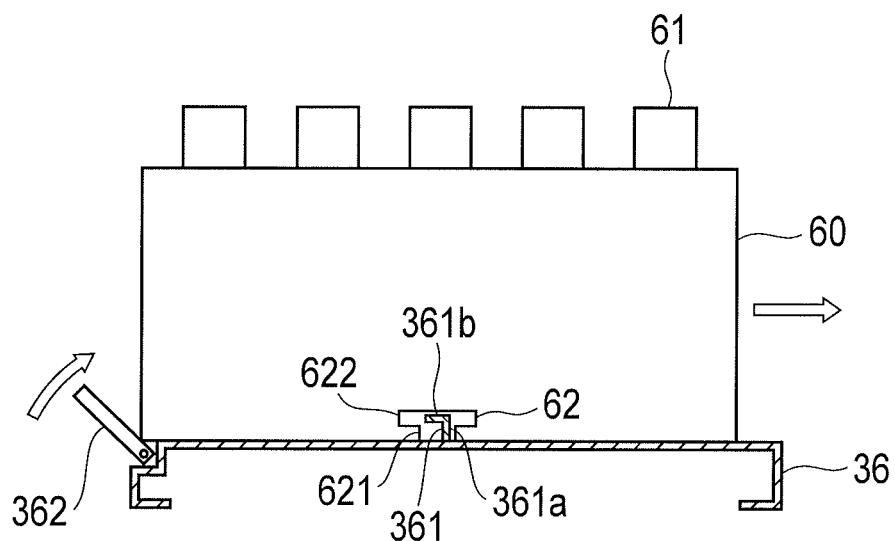
FIG. 7A is a diagram illustrating a cross-sectional view for explaining attachment of the rack to the tray.
Figure 7B:
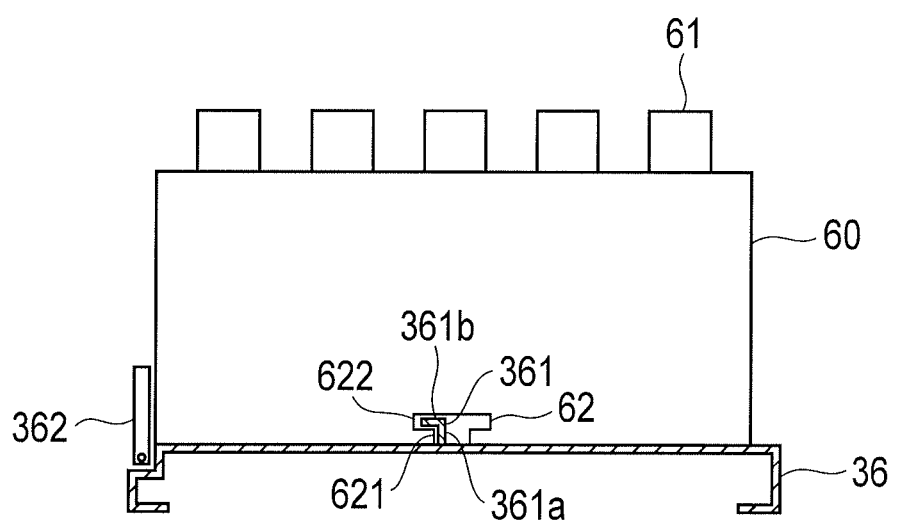
FIG. 7B is a diagram illustrating a cross-sectional view for explaining an engagement structure of the rack with the tray.

FIG. 7A and FIG. 7B illustrate procedures of attaching rack 60 to tray 36. Hereinbelow, the side on which plate-shaped members 362 of tray 36 are provided is referred to as the "left side," and its opposite side is referred to as the "right side." As illustrated in FIG. 7A, when rack 60 is to be attached to tray 36, the user presses down rack 60 while pushing plate-shaped member 362 toward the outside to open the plate-shaped member with a left corner on the lower end of rack 60. Here, the user inserts guide section 361 into notch portion 62 of rack 60. Notch portion 62 includes lower side portion 621 with a smaller width and upper side portion 622 with a larger width. The width of lower side portion 621 is larger than a lateral width of horizontal portion 361*b* of guide section 361. For this reason, it is possible to insert guide section 361 into notch portion 62.

As illustrated in FIG. 7A, when guide section 361 is inserted into notch portion 62 to a depth which brings a lower surface of rack 60 into contact with the upper surface of tray 36, horizontal portion 361*b* is positioned at the same height as that of upper side portion 622. Upper side portion 622 has a width larger than that of lower side portion 621, and extends beyond the left and right sides of lower side portion 621. When the user weakens the force of pressing down rack 60, plate-shaped member 362 is restored by the spring force and pushes rack 60 toward the right side, as illustrated in FIG. 7B. Thus, horizontal portion 361*b* is inserted into a left side portion of upper side portion 622, bringing rack 60 into engagement with guide section 361.

Rack 60 can move on the upper surface of tray 36 in the front-rear direction while in engagement with guide section 361. Thus, guide section 361 makes it possible to guide the transfer of rack 60 on tray 36, and to prevent derailing of rack 60 from tray 36.

Figure 7C:
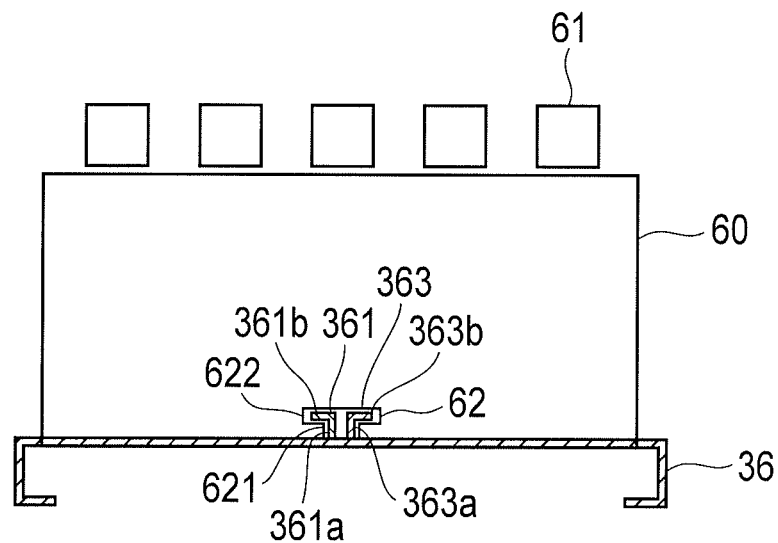
FIG. 7C is a diagram illustrating a cross-sectional view for explaining the engagement structure of the rack with the tray.

As illustrated in FIG. 5, on both end portions in the longitudinal direction of tray 36, attachment-detachment prevention sections 363 are provided which extend along guide section 361. As illustrated in FIG. 7C, each of attachment-detachment prevention sections 363 has, in a cross-sectional view, a cross-sectional shape symmetrical to the cross-sectional shape of guide section 361 with respect to a vertical axis passing through the center in a left-right direction of tray 36. To be more specific, attachment-detachment prevention section 363 includes vertical portion 363*a* parallel with vertical portion 361*a* of guide section 361 and horizontal portion 363*b* extending from an upper end of vertical portion 363*a* to the right side.

On each of both end portions in the longitudinal direction of tray 36, rack 60 engages both with guide section 361 and attachment-detachment prevention section 363. Here, horizontal portion 363*b* of attachment-detachment prevention section 363 is inserted into a right side portion of upper side portion 622. Since both of guide section 361 and attachment-detachment prevention section 363 engage with notch portion 62, rack 60 is prevented from moving leftward and rightward. Also, rack 60 is prevented from being pulled upward. Thus, on both end portions of tray 36 which are likely to be touched by the user's hands, rack 60 is reliably prevented from falling off.

Figure 8A:
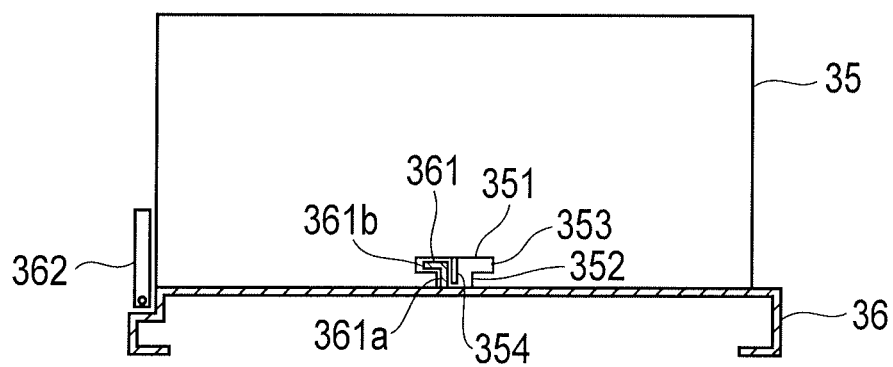
FIG. 8A is a diagram illustrating a cross-sectional view for explaining an attachment structure of a transfer prevention section to the tray.

As illustrated in FIG. 8A, provided at a central lower end portion of transfer prevention section 35 is notch portion 351 with a shape corresponding to guide section 361, and guide section 361 can engage with notch portion 351. The shape and the size of notch portion 351 of transfer prevention section 35 are the same as those of notch portion 62 of rack 60. To be more specific, notch portion 351 includes lower side portion 352 with a smaller width and upper side portion 353 with a larger width. Thus, transfer prevention section 35 can move on the upper surface of tray 36 in the front-rear direction while in engagement with guide section 361.

Bar-shaped contact member 354 is attached at the center of notch portion 351. Contact member 354 extends downward from the center in the left-right direction of the upper surface of upper side portion 353 of notch portion 351. When guide section 361 is in engagement with notch portion 351, contact member 354 is positioned on the right side of guide section 361. A lateral width of a space of lower side portion 352 on the left side of contact member 354 is smaller than the lateral width of horizontal portion 361b of guide section 361. Thus, transfer prevention section 35 is prevented from moving leftward and rightward. Also, transfer prevention section 35 is prevented from being pulled upward.

Figure 8B:
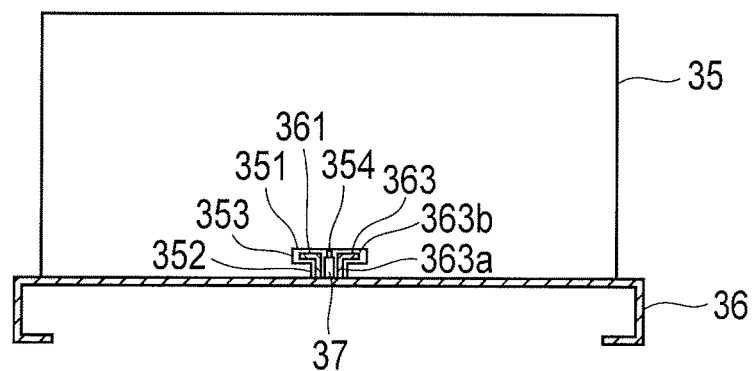
FIG. 8B is a diagram illustrating a cross-sectional view for explaining the attachment structure of the transfer prevention section to the tray.

As illustrated in FIG. 8B, the shape of notch portion 351 also corresponds to attachment-detachment prevention section 363. When guide section 361 and attachment-detachment prevention section 363 are in engagement with notch portion 351, contact member 354 is positioned between guide section 361 and attachment-detachment prevention section 363. A lateral width of a space of lower side portion 352 on the right side of contact member 354 is smaller than a lateral width of horizontal portion 363b of attachment-detachment prevention section 363. Both of guide section 361 and attachment-detachment prevention section 363 prevent transfer prevention section 35 from moving leftward and rightward, and prevent transfer prevention section 35 from being pulled upward.

Pin-shaped stop member 37 is attached to each of both ends in the longitudinal direction of tray 36. As illustrated in FIG. 8B, stop member 37 is provided between guide section 361 and attachment-detachment prevention section 363. When transfer prevention section 35 is positioned on each of both ends of tray 36, contact member 354 comes into contact with stop member 37. For this reason, transfer prevention section 35 does not move beyond stop member 37. Thus, transfer prevention section 35 is kept in engagement with guide section 361, and is not transferred from setting section 31 to import section 33 or export section 32. Contact member 354 and stop member 37 may have any shape such as a rectangular parallelepiped, a cube, or a column as long as they can come into contact with each other.

On the other hand, rack 60 does not include a contact member. For this reason, rack 60 does not interfere with stop member 37 on each of both ends of tray 36. Thus, it is possible to transfer rack 60 from import section 33 to setting section 31, and to transfer rack 60 from setting section 31 and export section 32.

As illustrated in FIG. 4, rack export-import unit 30 includes cover 38 which covers setting section 31. Cover 38 provided prevents dust and the like form entering sample container 61 and prevents racks 60 on setting section 31 from being touched.

Rack export-import unit 30 may not include cover 38. In particular, in the case of transporting a rack holding sample containers with a lid, cover 38 may not be provided because there is no possibility that dust enters the sample containers.

As illustrated in FIG. 3, rack export-import unit 30 includes operating panel 39 on the front side of export section 32. Operating panel 39 includes operating buttons.

As illustrated in FIG. 4, rack export-import unit 30 includes controller 310 inside thereof. Controller 310 controls the units of rack export-import unit 30 and communicates with control unit 50.

With reference again to FIG. 1, a description is provided for bar code read unit 70. Bar code read unit 70 includes bar code reader 71, setting section 72, import section 73, export section 74, and transporter 75.

Bar code read unit 70 is connected to transport unit 20 and rack export-import unit 30. Import section 73 is connected to export section 32 of rack export-import unit 30. Export section 74 is connected to first transporter 21 of transport unit 20. Transporter 75 is connected to second transporter 22 of transport unit 20 and import section 33 of rack export-import unit 30. Bar code read unit 70 is used for receiving racks 60a holding unmeasured samples from export section 32 of rack export-import unit 30, reading bar codes of racks 60a, and feeding racks 60a to first transporter 21. Bar code read unit 70 is used for receiving racks 60b holding samples completed with measurement from second transporter 22, and feeding the racks to import section 33 of rack export-import unit 30.

Bar code reader 71 is used to read a rack ID for identifying a rack using a bar code (hereinafter referred to as a "rack bar code") attached on the rack, and to read a sample ID for identifying a sample using a bar code (hereinafter referred to as a "sample bar code") attached on a sample container.

Setting section 72 has a rectangular shape long in the Y-direction in a plan view, and is formed flat so as to receive racks 60. Setting section 72 is provided on an upper surface of bar code read unit 70. A width of setting section 72 is slightly larger than the length of rack 60, and racks 60 can be mounted in a row on setting section 72 in the Y-direction. Bar code reader 71 is provided on a front end portion of setting section 72.

Import section 73 is provided on the front side of setting section 72, and export section 74 and transporter 75 are provided on the rear side of setting section 72. On setting section 72, racks 60 are transferred backward.

Each of import section 73 and export section 74 is a conveyor belt for transporting racks 60. Import section 73 receives racks 60a holding unmeasured samples from adjacent rack export-import unit 30 and transports the racks in the supply direction. Racks 60a on import section 73 are fed to setting section 72. Note that import section 73 and export section 74 are not limited to a conveyor belt.

After rack 60a is set on setting section 72 and bar code reader 71 reads the rack bar codes and the sample bar codes of the unmeasured samples being held, rack 60a is transferred backward on setting section 72 and then transferred from setting section 72 to export section 74. A size of export section 74 is large enough to set one rack 60 thereon. Export section 74 transports received racks 60a in the supply direction and feeds the racks to first transporter 21 of transport unit 20.

Retest wait unit 40 is set on the downstream side in the supply direction of transport unit 20. Retest wait unit 40 is connected to first transporter 21, receives racks 60b holding measured samples, and can set racks 60b thereon. Retest wait unit 40 is used in order to put racks 60b on standby for the result of the determination as to whether or not a retest is necessary.

Retest wait unit 40 is connected to second transporter 22 and feeds second transporter 22 with racks 60b which are completed with measurement and hold only samples determined not to require a retest. Here, "completed with measurement" means that all samples held by rack 60b are completed with measurement. Racks 60b set on retest wait unit 40 include not only racks 60b all samples of which are completed with measurement, but also racks 60b some or all samples of which are being measured. Second transporter 22 transports racks 60b completed with measurement, but does not transport racks 60b some or all samples of which are being measured. Retest wait unit 40 does not feed second transporter 22 with racks 60b holding samples determined to require a retest, but stores the racks.

Retest wait unit 40 may not be provided to measurement systems 100. In this case, it is possible to employ, instead of retest wait unit 40, a unit which receives racks 60b holding measured samples from first transporter 21, and feeds the racks to second transporter 22.

Figure 9:
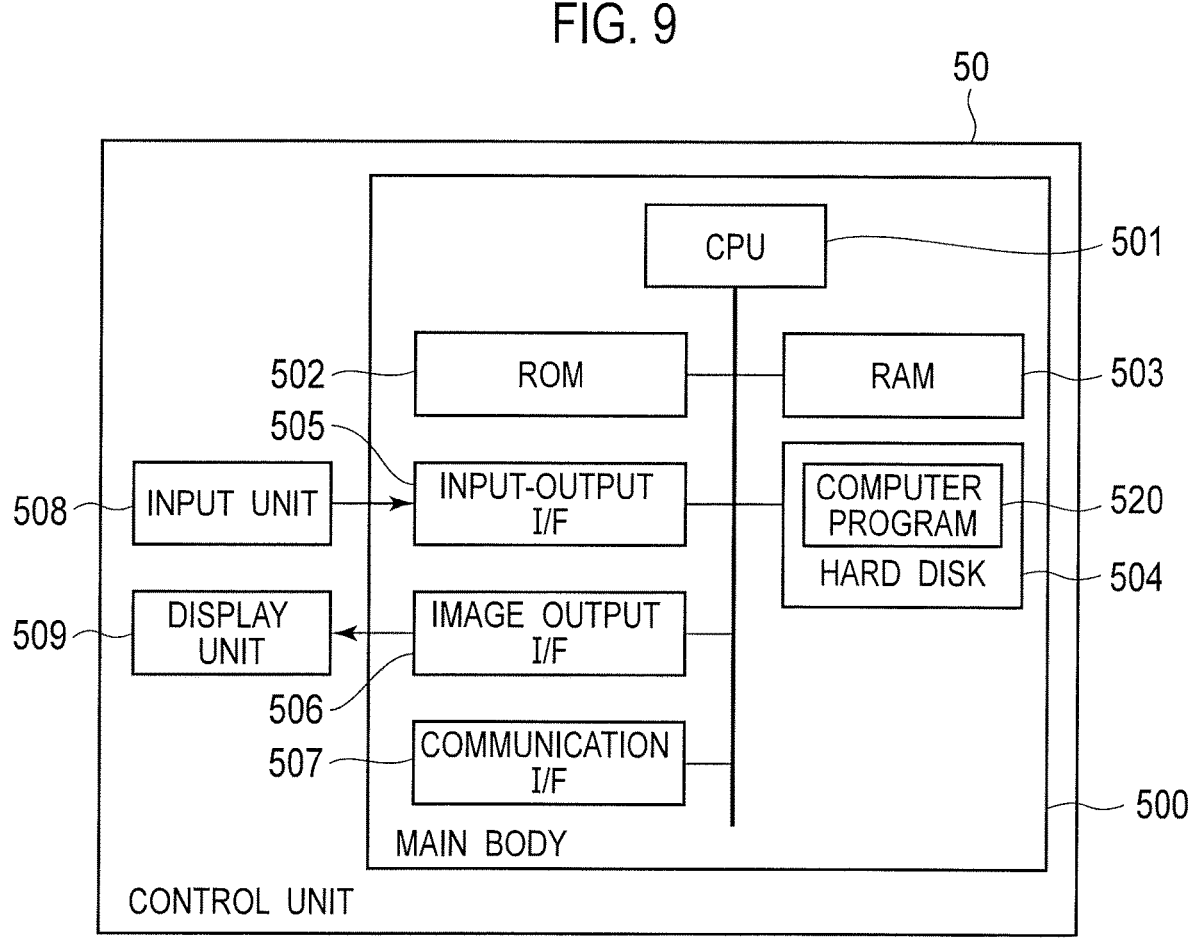
FIG. 9 is a diagram illustrating a block diagram illustrating a configuration of a control unit.

Control unit 50 includes a computer. With reference to FIG. 9, a description is provided for a configuration of control unit 50.

Control unit 50 includes main body 500, input unit 508, and display unit 509. Main body 500 includes CPU 501, ROM 502, RAM 503, hard disk 504, input-output interface 505, image output interface 506, and communication interface 507.

CPU 501 executes a computer program stored in ROM 502 and a computer program loaded into RAM 503. RAM 503 is used to read computer programs recorded in ROM 502 and hard disk 504. RAM 503 is also used as a work area for CPU 501 in the execution of a computer program.

Installed to hard disk 504 is computer program 520 for determining a transport destination of rack 60.

Input unit 508 is connected to input-output interface 505. Display unit 509 is connected to image output interface 506. Transport unit 20, rack export-import apparatus 300, and retest wait unit 40 are connected to communication interface 507, and perform data communication with control unit 50.

Communication interface 507 is connected to host computer 80. The measurement order for samples is registered with host computer 80, and host computer 80 transmits the order in response to an inquiry by control unit 50.

<Operation of Measurement System>

When measurement system 100 is to measure a sample, the user first installs tray 36 to setting section 31 of rack export-import unit 30. When tray 36 is to be installed to setting section 31, cover 38 is opened. Racks 60a holding unmeasured samples are mounted on tray 36, and the tray is installed to setting section 31 while sliding on the setting section from the front side of rack export-import unit 30. When tray 36 is installed to setting section 31, cover 38 is closed.

Figure 10:
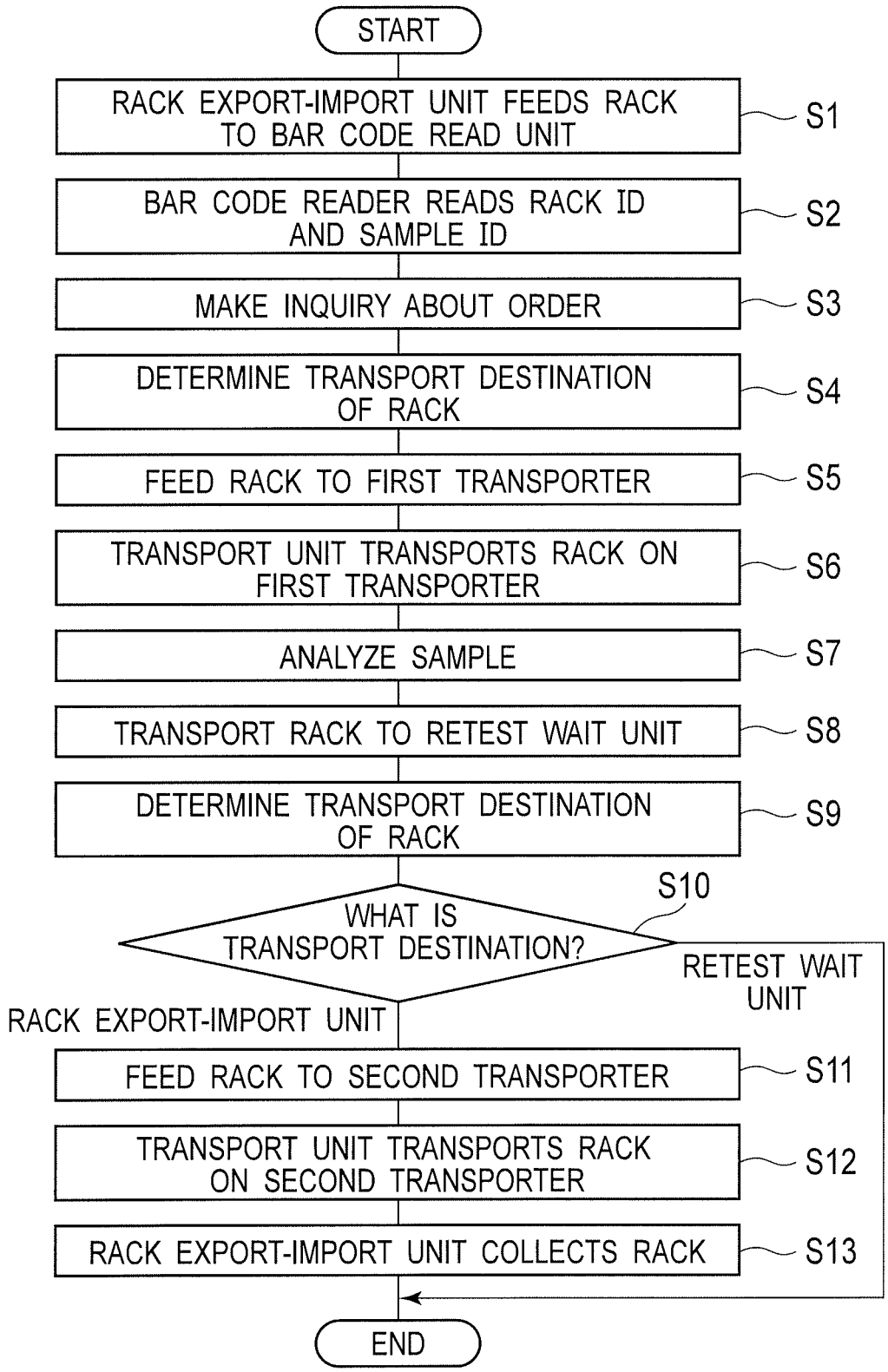
FIG. 10 is a diagram illustrating a flowchart illustrating operating procedures of the measurement system.

After tray 36 is installed to setting section 31, an operation of measurement system 100 is started. With reference to FIG. 10, a description is provided for the operation of measurement system 100.

At S1, rack export-import unit 30 feeds bar code read unit 70 with rack 60a holding unmeasured samples.

At the phase immediately after tray 36 is installed to setting section 31, transfer prevention section 35 is located on the rear side of setting section 31, and racks 60a holding unmeasured samples are set in a region of setting section 31 on the front side of transfer prevention section 35, as illustrated in FIG. 11A.

When racks 60a holding unmeasured samples are to be fed to a preceding unit, transfer units 34 transfer transfer prevention section 35 forward, thereby transferring all racks 60a on the front side of transfer prevention section 35 forward, as illustrated in FIG. 11B. Here, rack 60a on the frontmost side is transferred to export section 32. Export section 32 transports rack 60a in the supply direction, and feeds the rack to a preceding unit.

FIG. 10 is referred to again. At S2, bar code reader 71 of bar code read unit 70 reads the rack ID and the sample ID from the rack bar code and the sample bar code of rack 60a holding unmeasured samples. The rack ID and the sample ID thus read are transmitted to control unit 50.

At S3, control unit 50 uses the rack ID and the sample ID as keys to make an inquiry to host computer 80 about the order. Host computer 80 searches for the order which matches the received rack ID and the sample ID, and transmits the order to control unit 50.

At S4, control unit 50 receives the order from host computer 80, and determines, based on the order, the transport destination of rack 60a holding unmeasured samples.

The order contains information on test items, and control unit 50 determines measurement unit 10 which can measure the requested test items in the order as the transport destination. In such a case, control unit 50 is configured not to transport too many racks 60a to particular measurement unit 10.

When the transport destination is determined, bar code read unit 70 feeds at S5 rack 60a holding unmeasured samples to first transporter 21 of transport unit 20. At S6, transport unit 20 transports rack 60a on first transporter 21 in the supply direction. Measurement path 23 corresponding to measurement unit 10 being the transport destination pulls in rack 60a, and transports the rack to measurement unit 10.

When rack 60a holding unmeasured samples arrives at measurement unit 10 being the transport destination, measurement unit 10 aspirates at S7 a sample from sample container 61 held by rack 60a, and performs measurement of the sample. If two or more samples are held by rack 60a, measurement unit 10 performs measurement for all samples.

At S8, transport unit 20 transfers rack 60b, all samples of which have been aspirated and which has been provided for measurement, to first transporter 21 via measurement path 23, and transports the rack on first transporter 21 to retest wait unit 40. Retest wait unit 40 holds rack 60b until the result of the determination as to whether or not a retest is necessary is obtained.

Host computer 80 or measurement unit 10 determines whether or not a retest is necessary. The result of the determination as to whether or not a retest is necessary is transmitted to control unit 50. At S9, control unit 50 determines the transport destination of rack 60b holding measured samples based on the result of the determination as to whether or not a retest is necessary. The transport destination of rack 60b holding only samples determined not to require a retest is rack export-import unit 30. Control unit 50 determines rack export-import unit 30 with a space in setting section 31 as the transport destination of rack 60b holding only samples determined not to require a retest. The transport destination of rack 60b holding samples determined to require a retest is retest wait unit 40, and rack 60b is stored in retest wait unit 40.

The rule for determining the transport destination is not limited to the above-described one. The rack export-import unit to be the transport destination may be determined such that rack export-import units 30 are respectively set as a unit dedicated for storing racks holding samples which do not require a retest, a unit dedicated for storing racks holding samples which require a retest, and a unit dedicated for storing racks with a bar code read error, and racks are distributed based on the measurement results or the results of reading bar codes.

At S10, if the transport destination of rack 60b holding measured samples is retest wait unit 40, the transport operation for rack 60b is terminated.

At S10, if the transport destination of rack 60b holding measured samples is rack export-import unit 30, retest wait unit 40 feeds at S11 rack 60b to second transporter 22 of transport unit 20. At S12, transport unit 20 transports rack 60b on second transporter 22 to rack export-import unit 30 being the transport destination.

Rack 60b holding measured samples is fed from second transporter 22 to export section 74 of bar code read unit 70, and is fed by export section 74 to import section 33 of adjacent rack export-import unit 30. When rack 60b arrives at import section 33 of target rack export-import unit 30, introduction unit 331 feeds rack 60b to setting section 31, and at S13, rack export-import unit 30 collects rack 60b. As above, the transport operation for rack 60b is terminated.

Figure 12A:
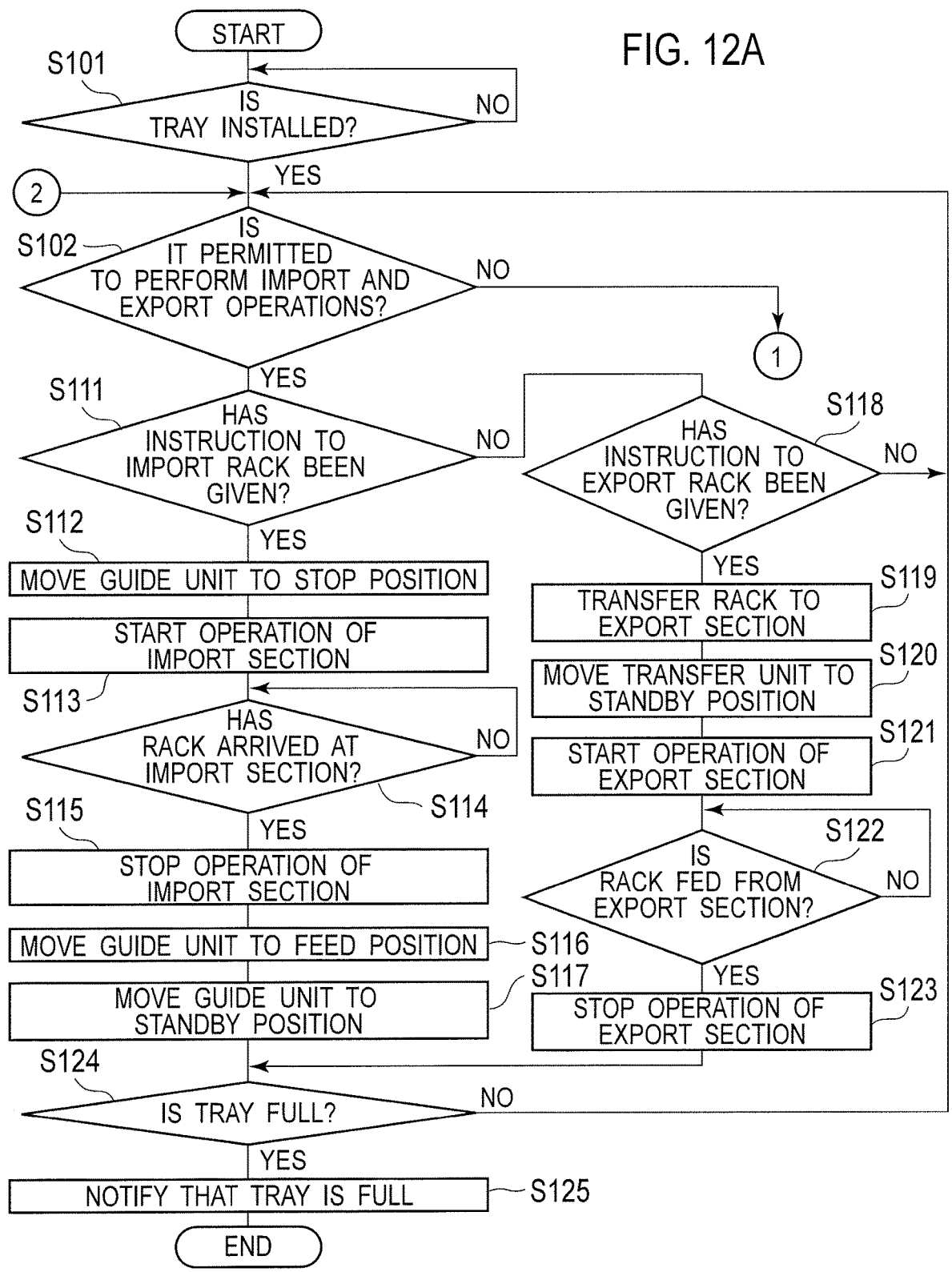
FIG. 12A is a diagram illustrating a flowchart illustrating operating procedures of the rack export-import unit.
Figure 12B:
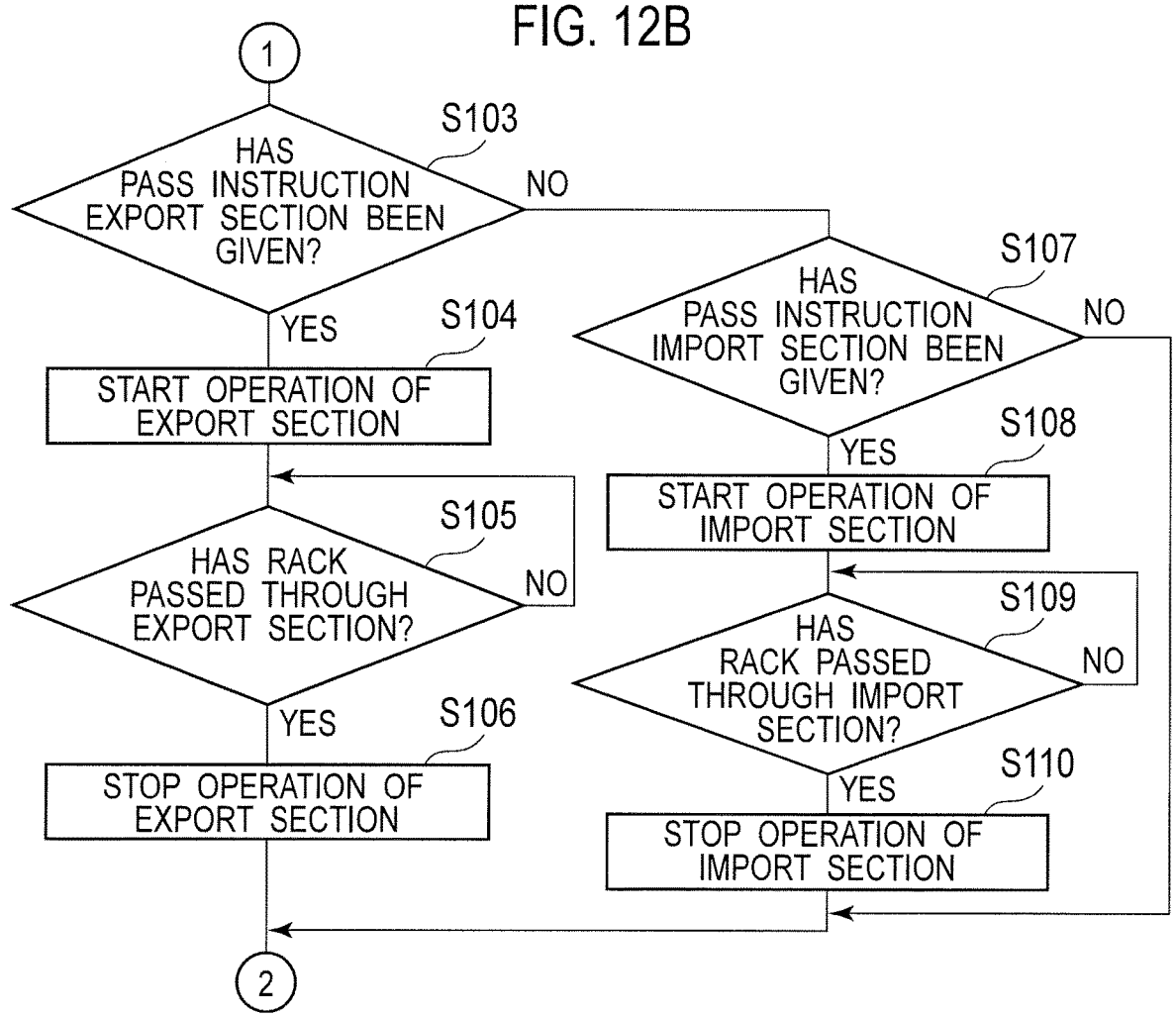
FIG. 12B is a diagram illustrating a flowchart illustrating the operating procedures of the rack export-import unit.

With reference to FIG. 12A and FIG. 12B, a description is provided for a detailed operation of rack export-import unit 30. At S101, controller 310 of rack export-import unit 30 determines whether or not tray 36 is installed to setting section 31. If the tray is not installed, controller 310 advances to NO at S101, and repeats the processing of S101. If tray 36 is installed, controller 310 advances to YES at S101, and executes S102.

If control unit 50 permits rack export-import unit 30 to perform import and export operations, the control unit transmits a permission signal for the import and export operations to permitted rack export-import unit 30. At S102, controller 310 determines whether or not it is permitted to perform the import and export operations. If it is not permitted to perform the import and export operations, controller 310 advances to NO at S102, and executes S103. If it is permitted to perform the import and export operations, controller 310 advances to YES at S102, and executes S111.

When rack 60a holding unmeasured samples is to be transported from one rack export-import unit 30 to bar code read unit 70 via preceding rack export-import units 30, it is necessary to pass rack 60a through export sections 32 of preceding rack export-import units 30. In this case, control unit 50 transmits an instruction signal which instructs rack export-import units 30, through which rack 60a is passed, to pass the rack through export sections 32.

At S103, controller 310 determines whether or not a pass instruction for export sections 32 has been given. If the pass instruction has been given, controller 310 advances to YES at S103, and executes S104. At S104, controller 310 operates export sections 32. Thus, rack 60a which is exported from a following unit and holds unmeasured samples moves through export sections 32, and is transferred to a preceding unit.

At S105, controller 310 determines from a sensor output signal whether or not rack 60a holding unmeasured samples has passed through export sections 32. If rack 60a is yet to pass through export sections 32, controller 310 advances to NO at S105, and repeats the processing of S105. If rack 60a has passed through export sections 32, controller 310 advances to YES at S105, and stops export sections 32 at S106. When the processing of S106 is terminated, controller 310 returns the processing to S102.

If the pass instruction for export sections 32 is yet to be given at S103, controller 310 advances to NO at S103, and executes S107.

When rack 60b holding measured samples is to be transported from bar code read unit 70 to following rack export-import unit 30 via preceding rack export-import units 30, it is necessary to pass rack 60b through import sections 33 of preceding rack export-import units 30. In this case, control unit 50 transmits an instruction signal which instructs rack export-import units 30, through which rack 60b is passed, to pass the rack through import sections 33.

Figure 13A:
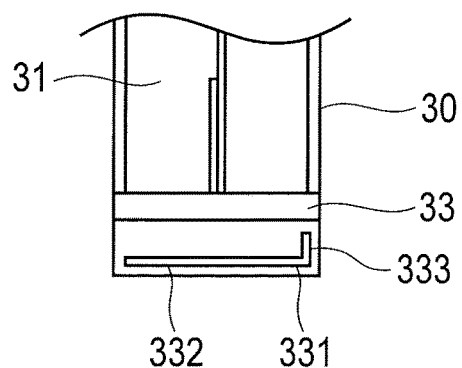
FIG. 13A is a diagram illustrating a plan view for explaining an operation of an introduction unit.

At S107, controller 310 determines whether or not a pass instruction for import sections 33 has been given. If the pass instruction has been given, controller 310 advances to YES at S107, and executes S108. At S108, controller 310 operates import sections 33. Thus, rack 60b which is exported from a preceding unit and holds measured samples moves through import sections 33, and is transferred to a following unit. Here, introduction unit 331 is positioned at a standby position on the rear side of import section 33, as illustrated in FIG. 13A. Rack 60b passes through import sections 33 without coming into contact with introduction unit 331.

FIG. 12B is referred to again. At S109, controller 310 determines from a sensor output signal whether or not rack 60b holding measured samples has passed through import sections 33. If rack 60b is yet to pass through import sections 33, controller 310 advances to NO at S109, and repeats the processing of S109. If rack 60b has passed through import sections 33, controller 310 advances to YES at S109, and stops import sections 33 at S110. When the processing of S110 is terminated, controller 310 returns the processing to S102.

If the pass instruction for import sections 33 is yet to be given at S107, controller 310 advances to NO at S107, and returns the processing to S102.

When racks 60b holding measured samples are to be collected to one rack export-import unit 30, control unit 50 transmits an instruction signal which instructs rack export-import unit 30 concerned to import racks 60b.

FIG. 12A is referred to. At S111, controller 310 determines whether or not an instruction to import rack 60b holding measured samples has been given. If the instruction to import rack 60b has been given, controller 310 advances to YES at S111, and executes S112.

Figure 13B:
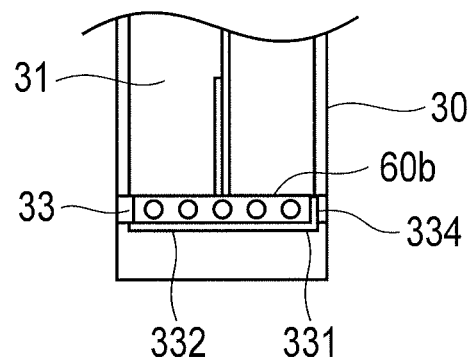
FIG. 13B is a diagram illustrating a plan view for explaining the operation of the introduction unit.

At S112, controller 310 moves introduction unit 331 to a stop position for stopping rack 60b holding measured samples. Thus, introduction unit 331 moves from the standby position illustrated in FIG. 13A to the stop position illustrated in FIG. 13B. In a plan view, introduction unit 331 has the shape of a plate material bent at the right angle, and includes first plate-shaped portion 332 extending in the return direction and second plate-shaped portion 333 extending forward from an end portion of first plate-shaped portion 332 on the downstream side in the return direction. At the standby position, both of first plate-shaped portion 332 and second plate-shaped portion 333 are located on the rear side of import section 33, as illustrated in FIG. 13A. In contrast, at the stop position, first plate-shaped portion 332 is located at a rear end of import section 33, and second plate-shaped portion 333 is located on import section 33, as illustrated in FIG. 13B.

FIG. 12A is referred to again. At S113, controller 310 operates import sections 33. Thus, rack 60b holding measured samples is transferred from a preceding unit to import sections 33. Rack 60b comes into contact with second plate-shaped portion 333 of introduction unit 331 located at the stop position, and stops on import section 33.

At S114, controller 310 determines from a sensor output signal whether or not rack 60b holding measured samples has arrived at import section 33. If rack 60b is yet to arrive at import section 33, controller 310 advances to NO at S114, and repeats the processing of S114. If rack 60b has arrived at import section 33, controller 310 advances to YES at S114, and executes S115.

Figure 13C:
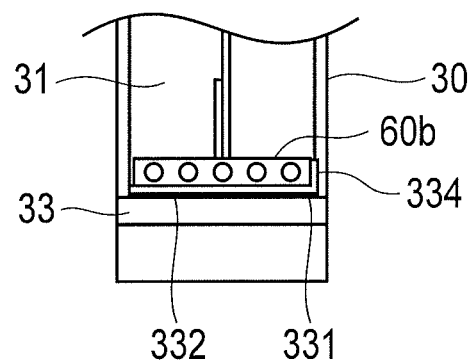
FIG. 13C is a diagram illustrating a plan view for explaining the operation of the introduction unit.

At S115, controller 310 stops import section 33. Next, at S116, controller 310 moves introduction unit 331 to a feed position for feeding rack 60b to setting section 31. Thus, introduction unit 331 moves from the stop position illustrated in FIG. 13B to the feed position illustrated in FIG. 13C. As illustrated in FIG. 13C, the feed position is a position at a rear end portion of setting section 31. Introduction unit 331 moves to the feed position, thereby pushing rack 60b to setting section 31.

Figure 11C:
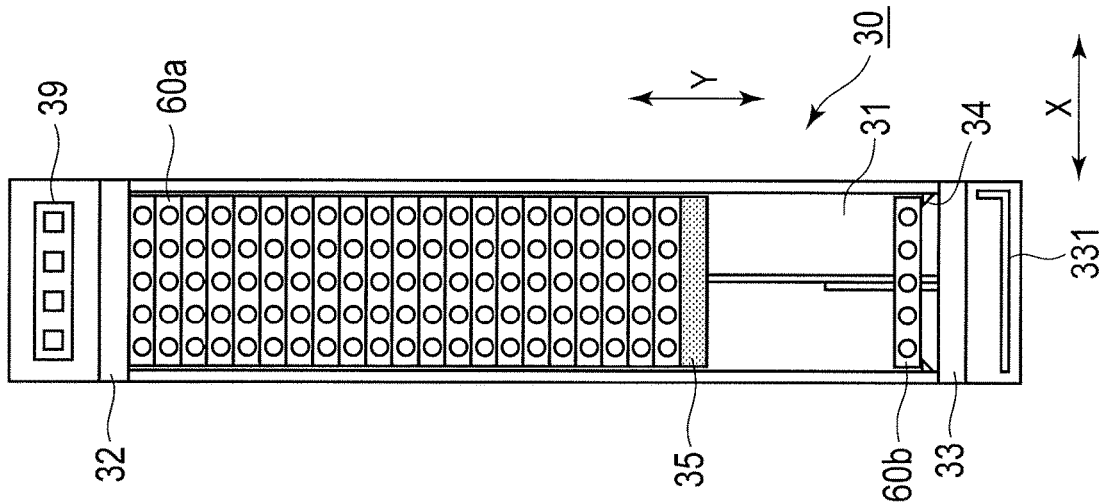
FIG. 11C is a diagram illustrating a plan view for explaining the setting of the racks on the rack export-import unit.
Figure 11D:
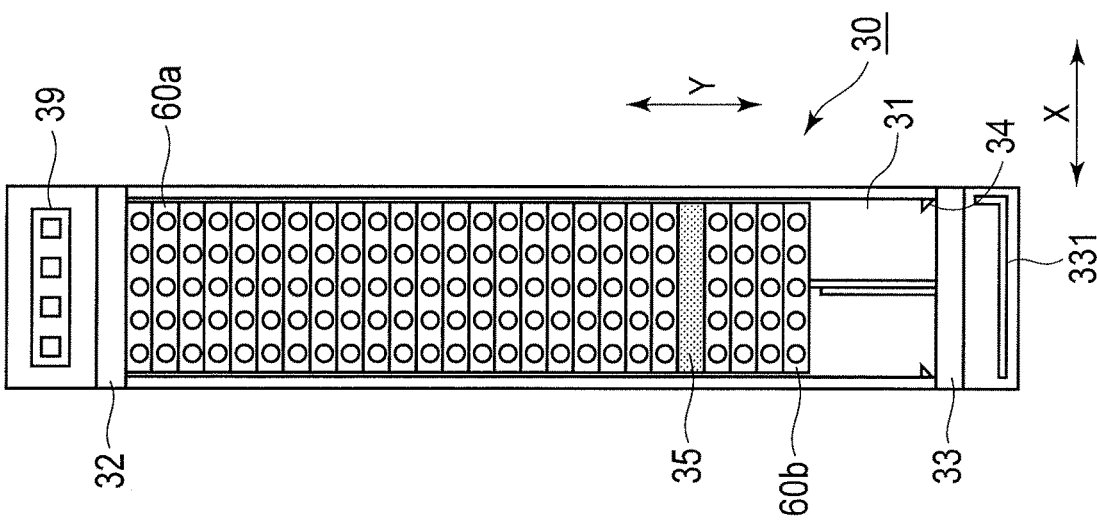
FIG. 11D is a diagram illustrating a plan view for explaining the setting of the racks on the rack export-import unit.

As illustrated in FIG. 11C, on setting section 31, rack 60b holding measured samples is transferred to a region on the rear side of transfer prevention section 35. Following racks 60b are sequentially transferred to the region on the rear side of transfer prevention section 35 in the same way. As illustrated in FIG. 11D, racks 60b are arranged and set in the region on the rear side of transfer prevention section 35.

FIG. 12A is referred to again. At S117, controller 310 moves introduction unit 331 backward to the standby position (see FIG. 13A). When the processing of S117 finishes, controller 310 executes S124.

If the instruction to import rack 60b is yet to be given at S111, controller 310 advances to NO at S111, and executes S118.

When rack 60a holding unmeasured samples is to be exported from one rack export-import unit 30, control unit 50 transmits an instruction signal which instructs rack export-import unit 30 concerned to export rack 60a.

At S118, controller 310 determines whether or not an instruction to export rack 60a holding unmeasured samples has been given. If the instruction to export rack 60a is yet to be given, controller 310 advances to NO at S118, and returns the processing to S102. If the instruction to export rack 60a has been given, controller 310 advances to YES at S118, and executes S119.

At S119, controller 310 controls transfer units 34, and transfers rack 60a which is set on setting section 31 and holds unmeasured samples to export section 32. As illustrated in FIG. 11D, if racks 60b holding measured samples are set in the region on the rear side of transfer prevention section 35, transfer units 34 transfer rack 60b on the rearmost side forward. As illustrated in FIG. 11B, if racks 60b are not set in the region on the rear side of transfer prevention section 35, transfer units 34 transfer transfer prevention section 35 forward. Thus, all racks 60a and 60b and transfer prevention section 35 set on setting section 31 are transferred forward, and rack 60a on the frontmost side is transferred to export section 32.

At S120, controller 310 moves transfer units 34 to the standby position at a rear end of setting section 31. Subsequently, at S121, controller 310 controls export section 32, and feeds rack 60a on export section 32 in the supply direction. Thus, rack 60a holding unmeasured samples is transferred to a preceding unit, and is transported to measurement unit 10.

Figure 11E:
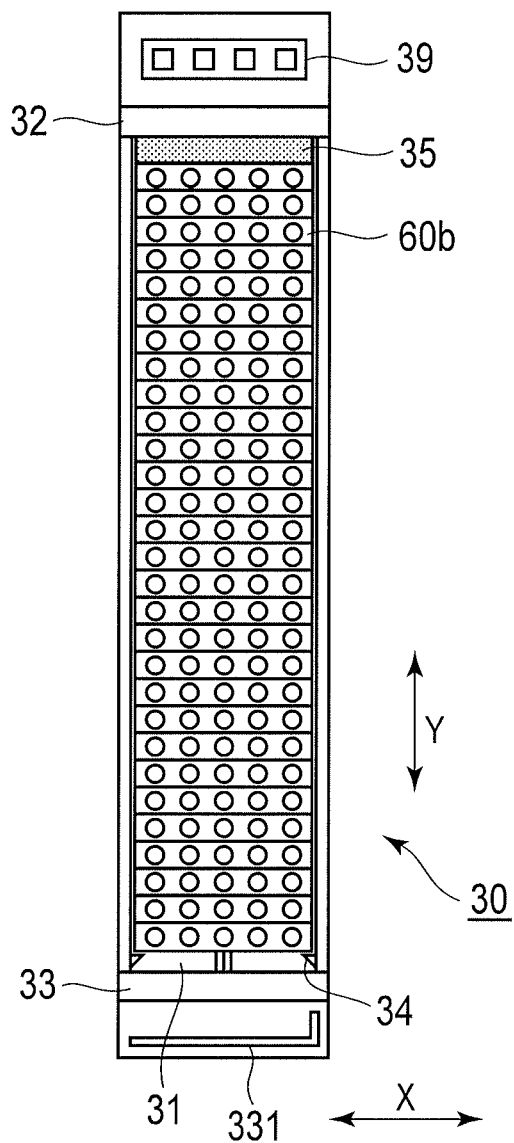
FIG. 11E is a diagram illustrating a plan view for explaining the setting of the racks on the rack export-import unit.

When all racks 60a holding unmeasured samples are exported from setting section 31, transfer prevention section 35 is positioned on the front side of all racks 60b holding measured samples, as illustrated in FIG. 11E. Here, prevention section 35 is not transferred to export section 32 even when transfer units 34 attempt to transfer transfer prevention section 35 forward because contact member 354 comes into contact with stop member 37. Thus, racks 60b holding measured samples are prevented from moving beyond transfer prevention section 35 and being transferred to export section 32. Hence, transfer prevention section 35 prevents racks 60b from being exported.

The configuration is not limited to one where contact member 354 and stop member 37 come into contact with each other and thereby prevent transfer prevention section 35 from being transferred to export section 32. The configuration may be such that when a sensor detects that transfer prevention section 35 has arrived at a front end portion of setting section 31, transfer units 34 are stopped and transfer prevention section 35 is prevented from being transferred to export section 32. Alternatively, the configuration may be such that a bar code reader is provided at the front end portion of setting section 31 without transfer prevention section 35 provided, and transfer units 34 are stopped when rack 60b holding measured samples is detected, with use of a rack ID read by the bar code reader, to have arrived at the front end portion of setting section 31. This prevents rack 60b from being exported.

At S122, controller 310 determines from a sensor output signal whether or not rack 60a holding unmeasured samples is fed from export section 32. If rack 60a is yet to be fed from export section 32, controller 310 advances to NO at S122, and repeats the processing of S122. If rack 60a is fed from export section 32, controller 310 advances to YES at S122, and executes S123.

At S123, controller 310 stops export section 32. When the processing of S123 finishes, controller 310 executes S124.

At S124, controller 310 determines whether or not the number of racks 60b set on setting section 31 and holding measured samples is equal to a set upper limit. If the number of racks 60b set on setting section 31 is less than the set upper limit, controller 310 advances to NO at S124, and returns the processing to S102. If the number of racks 60b set on setting section 31 is equal to the set upper limit, controller 310 advances to YES at S124, and executes S125.

At S125, controller 310 transmits a notification signal indicating that tray 36 is full to control unit 50, and terminates the processing. When control unit 50 receives the notification signal, the control unit displays on display unit 509 a notification screen for notifying the user that tray 36 of rack export-import unit 30 is full. This enables the user to know that tray 36 has to be replaced, and to efficiently replace tray 36.

As described above, export section 32 is provided on the front side of setting section 31, and import section 33 is provided on the rear side thereof. Racks 60a to be transported to measurement unit 10 and racks 60b collected from measurement unit 10 can be aligned and set on setting section 31. For this reason, rack 60a and rack 60b can share setting section 31. When tray 36 is to be installed to rack export-import unit 30, racks 60a holding unmeasured samples are set on tray 36 to the full, and when tray 36 is to be detached from rack export-import unit 30, racks 60b holding measured samples are set on tray 36 to the full. As described above, it is possible to install racks 60a and 60b by efficiently using the limited area of tray 36.

Measurement system 100 including measurement units 10 is capable of simultaneously measuring samples using measurement units 10, and thus has a high processing performance. Measurement system 100 which is capable of measuring multiple samples per unit time is required to set multiple racks thereon. For this reason, rack export-import unit 30, on which racks 60 can be set with efficient use of the area, is particularly useful for measurement system 100 including measurement units 10.

In the related art, a sample processing system is required to separately arrange a rack to be supplied to a sample processing apparatus and a rack collected from the sample processing apparatus in different rows. A medical facility such as a hospital and a medical examination center, for example, has a limited area for installing a sample processing system. For this reason, it is desired to set racks with efficient use of a limited area.

According to one or more embodiments, it is possible to set racks with efficient use of a limited area.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

The invention claimed is:

1. A measurement system comprising:
a measurement unit that measures a sample contained in a sample container;
a rack export-import unit; and
a transport unit including
a first transporter that transports a first rack capable of holding sample containers in a longitudinal direction of the first rack, from the rack export-import unit to the measurement unit, and
a second transporter that transports a second rack to the rack export-import unit from the measurement unit, wherein
the rack export-import unit is capable of setting racks thereon, is capable of transferring each of the set racks in a lateral direction of each of the set racks by moving a transfer unit in engagement with a rack, and includes an export conveyor at one end side of the rack export-import unit, an import conveyor at another end side of the rack export-import unit, the transfer unit to move the racks in the lateral direction, and an introduction unit that is capable of introducing racks from the import conveyor to be set in the rack export-import unit,
the export conveyor transports the first rack to the first transporter,
the import conveyor transports the second rack transported by the second transporter to a position where the introduction unit moves the second rack into the rack export-import unit, and
the rack export-import unit further includes a transfer prevention section that prevents the imported second rack from being directly exported via the export conveyor, wherein the transfer prevention section moves together with the imported second rack as the transfer unit pushes the imported second rack in the lateral direction.

2. The measurement system according to claim 1, wherein the rack export-import unit further includes a setting section that is capable of setting the racks thereon,
the export conveyor is positioned on one end side of the setting section and exports the first rack transferred from the setting section to the first transporter, and
the import conveyor is positioned on another end side of the setting section and imports the second rack from the second transporter.

3. The measurement system according to claim 1, wherein the rack export-import unit further includes a setting section on which a tray capable of setting the racks thereon is attached detachably,
the export conveyor is positioned on one end side of the setting section and exports the first rack transferred from the setting section to the first transporter, and
the import conveyor is positioned on another end side of the setting section and receives the second rack from the second transporter.

4. The measurement system according to claim 3, wherein the transfer prevention section is attached to the tray.

5. The measurement system according to claim 2, wherein the import conveyor imports the second rack transported by the second transporter in the longitudinal direction and then the introduction unit moves the imported second rack to the setting section in the lateral direction.

6. The measurement system according to claim 1, further comprising a bar code read unit that is connected to the transport unit and the rack export-import unit and that reads a bar code attached on the first rack exported from the rack export-import unit.

7. The measurement system according to claim 1, wherein the rack export-import unit further includes a setting section that is capable of setting the racks thereon,
the export conveyor is positioned on one end side of the setting section and exports the first rack transferred from the setting section to the first transporter, and
the import conveyor is positioned on another end side of the setting section and imports the second rack from the second transporter.

8. The measurement system according to claim 1, wherein the rack export-import unit further includes a setting section on which a tray capable of setting the racks thereon is attached detachably,
the export conveyor is positioned on one end side of the setting section and exports the first rack transferred from the setting section to the first transporter, and
the import conveyor is positioned on another end side of the setting section and receives the second rack from the second transporter.

9. The measurement system according to claim 3, wherein the import conveyor imports the second rack transported by the second transporter in the longitudinal direction and then the introduction unit moves the imported second rack to the setting section in the lateral direction.

10. The measurement system according to claim 4, wherein the import conveyor imports the second rack transported by the second transporter in the longitudinal direction and then the introduction unit moves the imported second rack to the setting section in the lateral direction.

11. The measurement system according to claim 1, further comprising a bar code read unit that is connected to the transport unit and the rack export-import unit and that reads a bar code attached on the first rack exported from the rack export-import unit.

12. The measurement system according to claim 2, further comprising a bar code read unit that is connected to the transport unit and the rack export-import unit and that reads a bar code attached on the first rack exported from the rack export-import unit.

13. The measurement system according to claim 3, further comprising a bar code read unit that is connected to the transport unit and the rack export-import unit and that reads a bar code attached on the first rack exported from the rack export-import unit.

14. The measurement system according to claim 4, further comprising a bar code read unit that is connected to the transport unit and the rack export-import unit and that reads a bar code attached on the first rack exported from the rack export-import unit.

* * * * *